US011604274B2

(12) United States Patent
Choi et al.

(10) Patent No.: US 11,604,274 B2
(45) Date of Patent: Mar. 14, 2023

(54) APPARATUS AND METHOD FOR COMPOSITION FOR DUAL-POLARIZATION WEATHER RADAR OBSERVATION DATA USING EARTH SPHERICAL COORDINATE SYSTEM

(71) Applicant: KOREA METEOROLOGICAL ADMINISTRATION, Seoul (KR)

(72) Inventors: Youn Choi, Seoul (KR); Sung Hwa Jung, Seoul (KR); Young A Oh, Seoul (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 359 days.

(21) Appl. No.: 16/942,287

(22) Filed: Jul. 29, 2020

(65) Prior Publication Data

US 2021/0063568 A1    Mar. 4, 2021

(30) Foreign Application Priority Data

Sep. 3, 2019   (KR) .......................... 10-2019-0108635

(51) Int. Cl.
*G01S 13/95* (2006.01)
*G01W 1/10* (2006.01)

(52) U.S. Cl.
CPC .......... *G01S 13/955* (2013.01); *G01S 13/958* (2013.01); *G01W 1/10* (2013.01)

(58) Field of Classification Search
CPC ........ G01S 13/955; G01S 13/66; G01S 13/74; G01S 13/76; G01S 13/762; G01S 13/767; G01S 13/785; G01S 13/82; G01S 13/88; G01S 13/89; G01S 13/95; G01S 13/951; G01S 13/958; G01S 7/024; G01S 7/025;
(Continued)

(56) References Cited

U.S. PATENT DOCUMENTS 5,530,450 A *  6/1996  Sohn ..................... G01S 7/2955
                                              342/185
6,400,313 B1 *  6/2002  Morici .................... G01S 7/003
                                              342/185
9,176,226 B1 * 11/2015  Sego .................... G01S 13/9029

FOREIGN PATENT DOCUMENTS

KR    10-2015-0026137 A    3/2015

* cited by examiner

Primary Examiner — Daniel R Miller
Assistant Examiner — Eric Sebastian Von Wald
(74) Attorney, Agent, or Firm — Bridgeway IP Law Group, PLLC; Jihun Kim

(57) ABSTRACT

An apparatus for composition for dual-polarization weather radar observation data includes: a coordinate system converting unit that converts a reference grid of an orthogonal coordinate system into a grid of a dual-polarization weather radar spherical coordinate system based on a latitudinal-longitudinal coordinate system for each individual dual-polarization weather radar by using an earth spherical coordinate system; a CAPPI data generating unit that generates CAPPI data based on the orthogonal coordinate system after mapping individual items of dual-polarization weather radar observation data on grid coordinates of the dual-polarization weather radar spherical coordinate system; and a CAPPI data compositing unit that performs composition of CAPPI data for each of the individual dual-polarization weather radars located at the same coordinate of the orthogonal coordinate system obtained by mapping the individual items of dual-polarization weather radar observation data thereon.

10 Claims, 7 Drawing Sheets

CAPPI 1

CAPPI 2

COMPOSITION CAPPI

(58) Field of Classification Search
CPC .......... G01S 7/026; G01S 7/53; G01S 7/2955;
G01W 1/10; G01B 7/004; G01B 11/002;
G05B 2219/33263; G05B 2219/33269;
G05B 2219/35354; G05B 2219/36503;
G05B 2219/36504; Y02A 90/10
See application file for complete search history.

APPARATUS AND METHOD FOR COMPOSITION FOR DUAL-POLARIZATION WEATHER RADAR OBSERVATION DATA USING EARTH SPHERICAL COORDINATE SYSTEM

BACKGROUND OF THE INVENTION

Field of the Invention

The present invention relates to a technology for composition for dual-polarization weather radar observation data, and more specifically, to an apparatus and a method for composition for dual-polarization weather radar observation data using an earth spherical coordinate system, the apparatus and the method enabling dual-polarization weather radar observation data to be converted into an orthogonal coordinate system through one projection process using an earth spherical coordinate system without executing several projection processes.

Description of the Related Art

In general, weather radars are remote sensing instruments that emit an electromagnetic wave in the air, receive and then process an electromagnetic wave returned after being reflected or scattered from a meteorological target object, and calculate a type, a size, a moving direction, or the like of the target object.

Among the weather radars, a dual-polarization weather radar is a radar using horizontal polarization and vertical polarization simultaneously and has performance of distinguishing between a raindrop, a snow flake, and a hailstone and also distinguishing non-precipitation ecosystem including as a bird, an insect, or the like from precipitation particles.

Data observed by the dual-polarization weather radar is obtained in a shape of a spherical coordinate system displayed with a distance r, an altitude angle θ, and an azimuth φ. Besides, numerical value model data and observation data obtained by a ground observing instrument or the like include data on an orthogonal coordinate system.

FIG. 1(a) is a diagram illustrating a spherical coordinate system as a display style of dual-polarization weather radar observation data, and FIG. 1(b) is a diagram illustrating an orthogonal coordinate system as a display style of numerical value model data and observation data obtained by a ground observing instrument or the like.

Specifically, since CAPPI data is generated for each observation point of a dual-polarization weather radar, the CAPPI data for each observation point of the dual-polarization weather radar needs to be subjected to composition in order to obtain "CAPPI data of national radar observation network region" (composition field). In other words, composition for dual-polarization weather radar observation data in a shape of spherical coordinate system is divided into processes of (1) generation of CAPPI data and (2) composition thereof. In general, in the above-described two processes for composition for the dual-polarization weather radar observation data in the shape of spherical coordinate system, as illustrated in FIGS. 1(a) and 1(b), dual-polarization weather radar observation data displayed in a spherical coordinate system based on radars for each altitude needs to be converted into CAPPI. Hence, in the related art, since a calculation process is complicated because the dual-polarization weather radar observation data needs to be converted into CAPPI data for each altitude (FIG. 1(b)) and an application location for the converted CAPPI data for each altitude needs to be found by applying interpolation, an error increases as a distance from the center of a radar increases in a horizontal direction in a projection method applying process, and errors are accumulated whenever the projection method is applied thereto, a problem arises in that comparison results with numerical value model data and observation data obtained by a ground observing instrument or the like become inaccurate.

SUMMARY OF THE INVENTION

Hence, the invention is made to solve the above-described problem of the related art, and objects thereof are to provide an apparatus and a method for composition for dual-polarization weather radar observation data using an earth spherical coordinate system, the apparatus and the method enabling the dual-polarization weather radar observation data to be converted into an orthogonal coordinate system through one projection process using the earth spherical coordinate system without executing several projection processes.

In order to achieve an above-described object, an embodiment of the invention provides an apparatus for composition for dual-polarization weather radar observation data, the apparatus including: a coordinate system converting unit that converts a reference grid of an orthogonal coordinate system into a grid of a dual-polarization weather radar spherical coordinate system based on a latitudinal-longitudinal coordinate system for each individual dual-polarization weather radar by using an earth spherical coordinate system; a CAPPI data generating unit that generates CAPPI data based on the orthogonal coordinate system after mapping individual items of dual-polarization weather radar observation data on grid coordinates of the dual-polarization weather radar spherical coordinate system; and a CAPPI data compositing unit that performs composition of CAPPI data for each of the individual dual-polarization weather radars located at the same coordinate of the orthogonal coordinate system obtained by mapping the individual items of dual-polarization weather radar observation data thereon.

Preferably, the coordinate system converting unit is configured to convert the reference grid of the orthogonal coordinate system into a reference grid of a latitudinal-longitudinal coordinate system, using an earth spherical coordinate system and a projection method selected to convert the orthogonal coordinate system into the latitudinal-longitudinal coordinate system, and to convert the generated reference grid of the latitudinal-longitudinal coordinate system into reference grids of a spherical coordinate system for each of the individual dual-polarization weather radars.

Preferably, the coordinate system converting unit is configured to convert coordinates (latitude ($lat._{mn}$), longitude ($lon._{mn}$), altitude ($z_{mn}$), m representing an identification number of a dual-polarization weather radar, n representing a grid number, $lat._{m0}$ and $lon._{m0}$ representing a latitude and a longitude of an m-th dual-polarization weather radar, respectively) of central points of six surfaces of a hexahedral reference grid converted into the latitudinal-longitudinal coordinate system, into coordinates of a dual-polarization weather radar spherical coordinate system by the following expressions.

$$\theta_m = \sin^{-1}\{z_m^2 - 2_m(h_m - k) - r_{gm}^2 + k^2\}\left(\because k = \frac{4}{3}r_e\right)$$

-continued $$r_m = \frac{(k+z_m)}{\cos\theta_m \sin\left(\frac{r_{gm}}{k}\right)}$$

$$\therefore r_{gm} = 2r_e \tan^{-1}\left(\frac{\sqrt{\sin\left(\frac{\Delta lat.}{2}\right)^2 + \cos(lat._{m0})\cos(lat._{mn})\sin\left(\frac{\Delta lon.}{2}\right)^2}}{\sqrt{1-\left[\sin\left(\frac{\Delta lat.}{2}\right)^2 + \cos(lat._{m0})\cos(lat._{mn})\sin\left(\frac{\Delta lon.}{2}\right)^2\right]}}\right)$$

$$\phi = \tan^{-1}\left(\frac{\sin(\Delta lon.)\cos(lat._1)}{\cos(lat._0)\sin(lat._1) - \sin(lat._0)\cos(lat._1)\cos(\Delta lon.)}\right)$$

(Here, coordinates of central points of the six surfaces are obtained by converting $(x_n+\Delta x/2, y_n, z_n)$, $(x_n-\Delta x/2, y_n, z_n)$, $(x_n, y_n+\Delta y/2, z_n)$, $(x_n, y_n-\Delta y/2, z_n)$, $(x_n, y_n, z_n+\Delta z/2)$, and $(x_n, y_n, z_n-\Delta z/2)$ into coordinates of the latitudinal-longitudinal coordinate system, $\Delta x$, $\Delta y$, and $\Delta z$ represent resolution of axes of an orthogonal coordinate system, $\theta_{mn}$ represents an altitude angle (radian) of a dual-polarization weather radar, $r_{mn}$ represents a distance (km) from a dual-polarization weather radar, $\phi_{mn}$ represents an azimuth (radian) of a dual-polarization weather radar, $r_{gm}$ represents a ground distance (km) in a dual-polarization weather radar, $r_e$ represents the earth radius (=6,371.00877 km), $(lat._{m0}, lon._{m0})$ represents a central latitude and longitude (radian) of a dual-polarization weather radar, $(lat._{mn}, lon._{mn})$ represents a grid latitude and longitude (radian), $\Delta lat._m = lat._{mn} - lat._{m0}$ (radian), $\Delta lon._m = lon._{mn} - lon._{m0}$ (radian), $h_m$ represents an altitude of a dual-polarization weather radar above sea level, and m as a subscript represents an identification number of a dual-polarization weather radar.)

Preferably, the CAPPI data generating unit is configured to map items of observation data of individual dual-polarization weather radars located within coordinates of central points of six surfaces of the reference grid of the dual-polarization weather radar spherical coordinate system, and to generate CAPPI data as a CAPPI grid by converting a spherical coordinate $(r_{mn}, \theta_{mn}, \phi_{mn})$ obtained by mapping items of the m-th dual-polarization weather radar observation data into an orthogonal coordinate system $(x_n, y_n, z_n)$ and setting a CAPPI observation value.

Preferably, conversion of the spherical coordinate obtained by mapping the items of dual-polarization weather radar observation data thereon into the orthogonal coordinate system means conversion of the spherical coordinate into an orthogonal coordinate system obtained by applying a projection method corresponding to the same grid number in a dual-polarization weather radar.

Preferably, the CAPPI observation value is set by selecting one from items of analysis information of the items of dual-polarization weather radar observation data in the CAPPI grid, depending on a purpose of weather analysis.

Preferably, the items of analysis information of the items of dual-polarization weather radar observation data are configured to include one or more values of a mean value, a maximum value, or a maximum frequency value of the items of dual-polarization weather radar observation data in the CAPPI grid.

In order to achieve an above-described object, another embodiment of the invention provides a method for composition for dual-polarization weather radar observation data, the method including: a coordinate system converting step of converting a reference grid of an orthogonal coordinate system into a grid of a dual-polarization weather radar spherical coordinate system based on a latitudinal-longitudinal coordinate system for each individual dual-polarization weather radar by using an earth spherical coordinate system; a CAPPI data generating step of generating CAPPI data based on the orthogonal coordinate system after mapping individual items of dual-polarization weather radar observation data on grid coordinates of the dual-polarization weather radar spherical coordinate system; and a CAPPI data generating step of performing composition of CAPPI data for each of the individual dual-polarization weather radars located at the same coordinate of the orthogonal coordinate system obtained by mapping the individual items of dual-polarization weather radar observation data, and generating composited CAPPI data.

Preferably, the coordinate system converting step is configured to include a latitudinal-longitudinal coordinate system-based conversion step of converting the reference grid of the orthogonal coordinate system into a reference grid of a latitudinal-longitudinal coordinate system, using an earth spherical coordinate system and a projection method selected to convert the orthogonal coordinate system into the latitudinal-longitudinal coordinate system, and a dual-polarization weather radar spherical coordinate system-based conversion step of converting the generated reference grid of the latitudinal-longitudinal coordinate system into reference grids of a spherical coordinate system for each of the individual dual-polarization weather radars.

Preferably, in dual-polarization weather radar spherical coordinate system-based conversion step, coordinates (latitude $(lat._{mn})$, longitude $(lon._{mn})$, altitude $(z_{mn})$, m representing an identification number of a dual-polarization weather radar, n representing a grid number, $lat._{m0}$ and $lon._{m0}$ representing a latitude and a longitude of an m-th dual-polarization weather radar, respectively) of central points of six surfaces of a hexahedral reference grid converted into the latitudinal-longitudinal coordinate system are converted into coordinates of a dual-polarization weather radar spherical coordinate system by the following expressions.

$$\theta_m = \sin^{-1}\{z_m^2 - 2_m(h_m-k) - r_{gm}^2 + k^2\}\left(\because k = \frac{4}{3}r_e\right)$$

$$r_m = \frac{(k+z_m)}{\cos\theta_m \sin\left(\frac{r_{gm}}{k}\right)}$$

$$\therefore r_{gm} = 2r_e \tan^{-1}\left(\frac{\sqrt{\sin\left(\frac{\Delta lat.}{2}\right)^2 + \cos(lat._{m0})\cos(lat._{mn})\sin\left(\frac{\Delta lon.}{2}\right)^2}}{\sqrt{1-\left[\sin\left(\frac{\Delta lat.}{2}\right)^2 + \cos(lat._{m0})\cos(lat._{mn})\sin\left(\frac{\Delta lon.}{2}\right)^2\right]}}\right)$$

$$\phi = \tan^{-1}\left(\frac{\sin(\Delta lon.)\cos(lat._1)}{\cos(lat._0)\sin(lat._1) - \sin(lat._0)\cos(lat._1)\cos(\Delta lon.)}\right)$$

(Here, coordinates of central points of the six surfaces are obtained by converting $(x_n+\Delta x/2, y_n, z_n)$, $(x_n-\Delta x/2, y_n, z_n)$, $(x_n, y_n+\Delta y/2, z_n)$, $(x_n, y_n-\Delta y/2, z_n)$, $(x_n, y_n, z_n+\Delta z/2)$, and $(x_n, y_n, z_n-\Delta z/2)$ into coordinates of the latitudinal-longitudinal coordinate system, $\Delta x$, $\Delta y$, and $\Delta z$ represent resolution of axes of an orthogonal coordinate system, $\theta_{mn}$ represents an altitude angle (radian) of a dual-polarization weather radar, $r_{mn}$ represents a distance (km) from a dual-polarization weather radar, $\phi_{mn}$ represents an azimuth (radian) of a dual-polarization weather radar, $r_{gm}$ represents a ground distance (km) in a dual-polarization weather radar, $r_e$ represents the earth radius (=6,371.00877 km), $(lat._{m0}, lon._{m0})$ represents a central latitude and longitude (radian) of a dual-polarization weather radar, $(lat._{mn}, lon._{mn})$ represents a grid latitude and longitude (radian), $\Delta lat._m = lat._{mn} - lat._{m0}$ (radian), $\Delta lon._m = lon._{mn} - lon._{m0}$ (radian), $h_m$ represents an altitude of a dual-polarization weather radar above sea level, and m as a subscript represents an identification number of a dual-polarization weather radar.)

Preferably, the CAPPI data generating step is configured to include a dual-polarization weather radar observation data mapping step of mapping items of observation data of individual dual-polarization weather radars located within coordinates of central points of six surfaces of the reference grid of the dual-polarization weather radar spherical coordinate system, and a CAPPI data generating step of generating CAPPI data as a CAPPI grid by converting a spherical coordinate $(r_{mn}, \theta_{mn}, \phi_{mn})$ obtained by mapping items of m-th dual-polarization weather radar observation data, into an orthogonal coordinate system $(x_n, y_n, z_n)$ and setting a CAPPI observation value.

Preferably, conversion of the spherical coordinate obtained by mapping the items of dual-polarization weather radar observation data into the orthogonal coordinate system means conversion of the spherical coordinate into an orthogonal coordinate system obtained by applying a projection method corresponding to the same grid number in a dual-polarization weather radar.

Preferably, the CAPPI observation value is set by selecting one from items of analysis information of the items of dual-polarization weather radar observation data in the CAPPI grid, depending on a purpose of weather analysis.

Preferably, the items of analysis information of the items of dual-polarization weather radar observation data are configured to include one or more values of a mean value, a maximum value, or a maximum frequency value of the items of dual-polarization weather radar observation data in the CAPPI grid.

DETAILED DESCRIPTION OF THE PREFERRED EMBODIMENTS

Figure 1A:
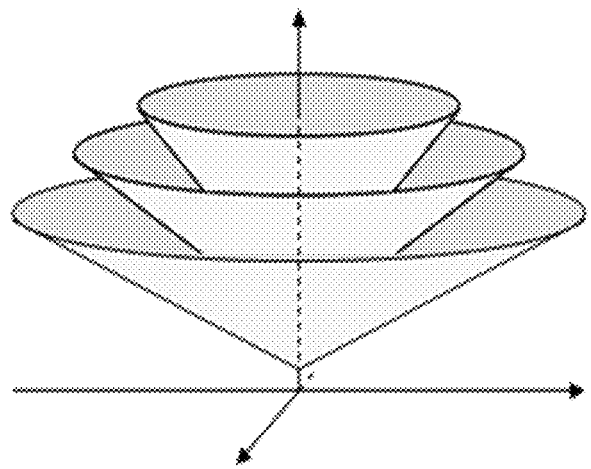
FIGS. 1(a) and 1(b) are diagrams illustrating a concept of converting dual-polarization weather radar observation data into an orthogonal coordinate in the related art.
Figure 1B:
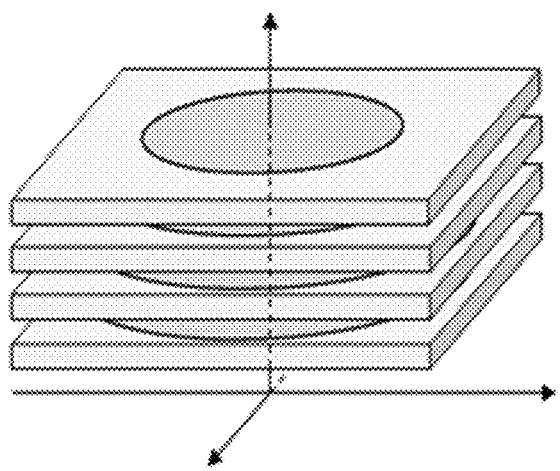

In the following description of the invention, when detailed description of a known function or configuration in the related art is concluded to make the gist of the invention unnecessarily obscure, the detailed description thereof will be omitted.

An embodiment according to a concept of the invention can be variously modified and can have various modification examples, and thus specific embodiments are illustrated in the drawings and are described in detail in this specification or application. However, the embodiment according to the concept of the invention is not to be limited to a specific disclosed example, and the invention is construed to include every modification, equivalent, and alternative which are included in the idea and the technical scope of the invention.

When a configurational element is "coupled" or "connected" to another configurational element in the following description, the configurational element may be directly coupled or connected to the other configurational element, but the description needs to be construed as that still another configurational element can be presented between the configurational elements. On the other hand, when a configurational element is "directly coupled" or "directly connected" to another configurational element in the following description, the description needs to be construed as that no configurational element is presented between the configurational elements. The same is true of words such as "between", "directly between", "adjacent to" or "directly adjacent to" used to describe a relationship between configurational elements.

Terms used in this specification are only used to describe a specific embodiment and are not intentionally used to limit the invention thereto. A singular noun includes a meaning of its plural form, unless obviously implied otherwise in context. In this specification, words such as "to include" or "to have" need to be construed to specify that a feature, a number, a step, an operation, a configurational element, a part, or an assembly thereof provided therein is present and not to exclude presence or a possibility of addition of one or more other features, numbers, steps, operations, configurational elements, parts, or assemblies thereof in advance.

Hereinafter, the invention will be described in more detail with reference to the accompanying drawings illustrating embodiments of the invention.

Figure 2:
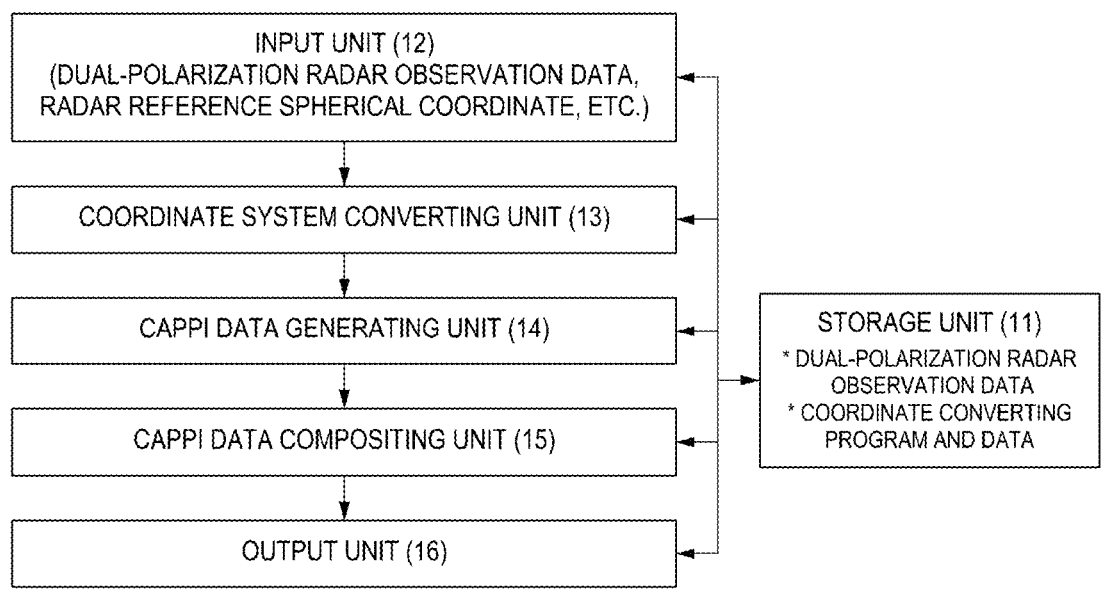
FIG. 2 is a functional block diagram of an apparatus for composition for dual-polarization weather radar observation data according to an embodiment of the invention.

FIG. 2 is a functional block diagram of an apparatus 10 for composition for dual-polarization weather radar observation data according to an embodiment of the invention.

As illustrated in FIG. 2, the apparatus 10 for composition for dual-polarization weather radar observation data according to the embodiment of the invention includes a storage unit 11 configured of a storage device that stores calculation data including dual-polarization weather radar observation data and an expression and a program for composition for dual-polarization weather radar data, an input unit 12 configured of an input device such as a data reader, a data input/output port, a keypad, or a communication port for inputting data online which enables the dual-polarization weather radar observation data to be input, the observation data including uncompensated horizontal reflectivity $Z_H$, compensated horizontal reflectivity $CZ$, radial velocity $V_r$, spectral width SW, differential reflectivity $Z_{DR}$, differential phase $\phi_{DR}$, specific differential phase $K_{DP}$, correlation coefficient $\rho hv$, quality index SQ, hydrometeor HC information, dual-polarization weather radar latitudinal and longitudinal information, or the like, a coordinate system converting unit 13 that converts a reference grid of an orthogonal coordinate system into a grid of a dual-polarization weather radar spherical coordinate system based on a latitudinal-longitudinal coordinate system for each individual dual-polarization weather radar by using an earth spherical coordinate system, a CAPPI data generating unit 14 that generates CAPPI data based on the orthogonal coordinate system after mapping individual items of dual-polarization weather radar observation data on grid coordinates of the dual-polarization weather radar spherical coordinate system, a CAPPI data compositing unit 15 that performs composition of CAPPI data for each of the individual dual-polarization weather radars located at the same coordinate of the orthogonal coordinate system obtained by mapping the individual items of dual-polarization weather radar observation data thereon, and an output unit 16 configured to include a monitor, a printer, or a communication device for transmission to outside, or the like which is provided to display a driving state of the apparatus 10 for composition for dual-polarization weather radar observation data and calculation result information of composition of the dual-polarization weather radar observation data input by the input unit 12.

In such a configuration described above, the coordinate system converting unit 13 is configured to convert a coordinate of a central point of a hexahedron of the reference grid of the orthogonal coordinate system into a coordinate of a reference grid of the latitudinal-longitudinal coordinate system, using an earth spherical coordinate system and a projection method selected to convert the orthogonal coordinate system into the latitudinal-longitudinal coordinate system, and to convert a coordinate of a central point of a hexahedron of the reference grid of the latitudinal-longitudinal coordinate system into a coordinate of a central point of reference grids of a spherical coordinate system for each of the individual dual-polarization weather radars.

At that point, coordinates (latitude ($lat._{mn}$), longitude ($lon._{mn}$), altitude ($z_{mn}$), m representing an identification number of a dual-polarization weather radar, n representing a grid number, $lat._{m0}$ and $lon._{m0}$ representing a latitude and a longitude of an m-th dual-polarization weather radar, respectively) of central points of six surfaces of a hexahedral reference grid converted into the latitudinal-longitudinal coordinate system are converted into coordinates of central points of a hexahedron of grid points of a dual-polarization weather radar spherical coordinate system by Expressions (1) to (4). In other words, the coordinates of the central points of the six surfaces are obtained by converting $(x_n+\Delta x/2, y_n, z_n)$, $(x_n-\Delta x/2, y_n, z_n)$, $(x_n, y_n+\Delta y/2, z_n)$, $(x_n, y_n-\Delta y/2, z_n)$, $(x_n, y_n, z_n+\Delta z/2)$, $(x_n, y_n, z_n-\Delta z/2)$ into coordinates of the latitudinal-longitudinal coordinate system. Here, $\Delta x$, $\Delta y$, and $\Delta z$ represent resolution of axes of an orthogonal coordinate system.

$$\theta_m = \sin^{-1}\{z_m^2 - 2_m(h_m - k) - r_{gm}^2 + k^2\}\left(\because k = \frac{4}{3}r_e\right) \quad \text{Expression 1}$$

$$r_m = \frac{(k + z_m)}{\cos\theta_m \sin\left(\frac{r_{gm}}{k}\right)} \quad \text{Expression 2}$$

$$\therefore r_{gm} = \quad \text{Expression 3}$$

$$2r_e \tan^{-1}\left(\frac{\sqrt{\sin\left(\frac{\Delta lat.}{2}\right)^2 + \cos(lat._{m0})\cos(lat._{mn})\sin\left(\frac{\Delta lon.}{2}\right)^2}}{\sqrt{1 - \left[\sin\left(\frac{\Delta lat.}{2}\right)^2 + \cos(lat._{m0})\cos(lat._{mn})\sin\left(\frac{\Delta lon.}{2}\right)^2\right]}}\right)$$

$$\phi = \tan^{-1}\left(\frac{\sin(\Delta lon.)\cos(lat._{-1})}{\cos(lat._{-0})\sin(lat._{-1}) - \sin(lat._{-0})\cos(lat._{-1})\cos(\Delta lon.)}\right) \quad \text{Expression 4}$$

Here, $\theta_{mn}$ represents an altitude angle (radian) of a dual-polarization weather radar, $r_{mn}$ represents a distance (km) from a dual-polarization weather radar, $\phi_{mn}$ represents an azimuth (radian) of a dual-polarization weather radar, $r_{gm}$ represents a ground distance (km) in a dual-polarization weather radar, $r_e$ represents the earth radius (=6,371.00877 km), ($lat._{m0}$, $lon._{m0}$) represents a central latitude and longitude (radian) of a dual-polarization weather radar, ($lat._{mn}$, $lon._{mn}$) represents a grid latitude and longitude (radian), $\Delta lat._m$, $=lat._{mn}-lat._{m0}$ (radian), $\Delta lon._m$, $=lon._{mn}-lon._{m0}$ (radian), $h_m$ represents an altitude of a dual-polarization weather radar above sea level, and m as a subscript represents an identification number of a dual-polarization weather radar.

The CAPPI data generating unit 14 can be configured to map items of observation data of individual dual-polarization weather radars located within coordinates of central points of six surfaces of the reference grid of the dual-polarization weather radar spherical coordinate system, and to generate CAPPI data as a CAPPI grid by converting coordinates of a spherical coordinate system obtained by mapping items of the m-th dual-polarization weather radar observation data thereon, into coordinates of an orthogonal coordinate system and setting a CAPPI observation value.

At that point, the CAPPI observation value is set by selecting one from items of analysis information of the items of dual-polarization weather radar observation data in the CAPPI grid, depending on a purpose of weather analysis. The items of analysis information of the items of dual-polarization weather radar observation data are configured to include one or more values of a mean value, a maximum value, or a maximum frequency value of the items of dual-polarization weather radar observation data in the CAPPI grid.

Figure 3:
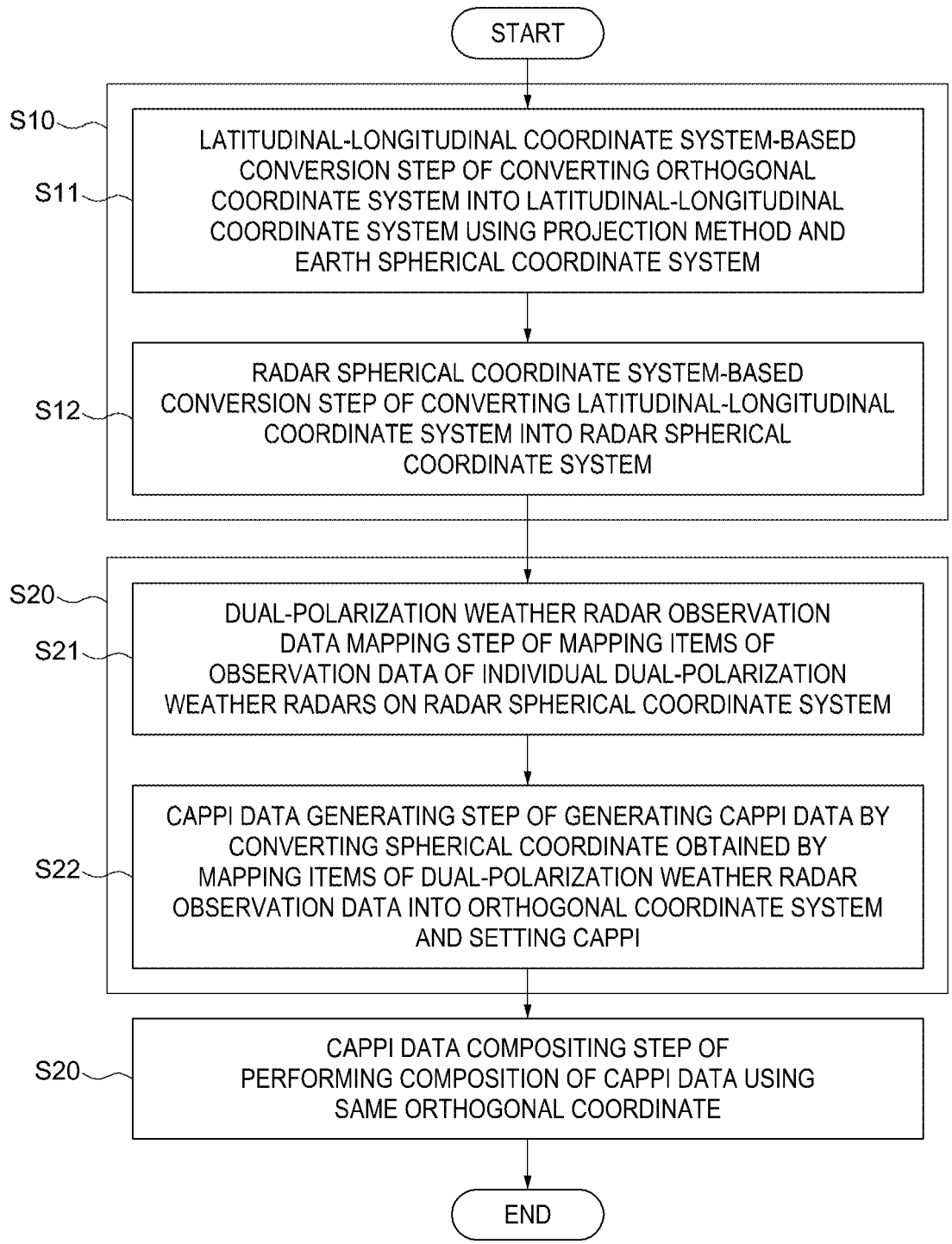
FIG. 3 is a flowchart illustrating processes of a method for composition for dual-polarization weather radar observation data according to another embodiment of the invention.
Figure 4A:
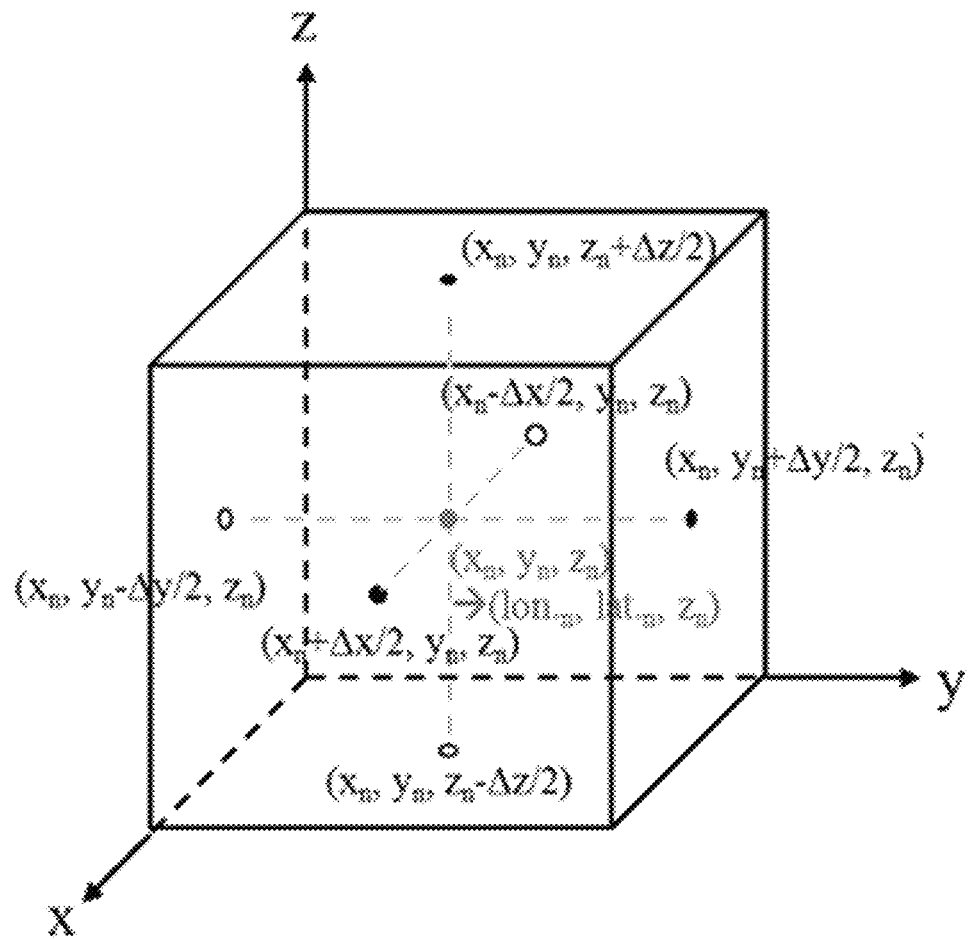
FIGS. 4(a) and 4(b) are diagrams illustrating coordinate conversion in a coordinate converting step according to the other embodiment of the invention.
Figure 4B:
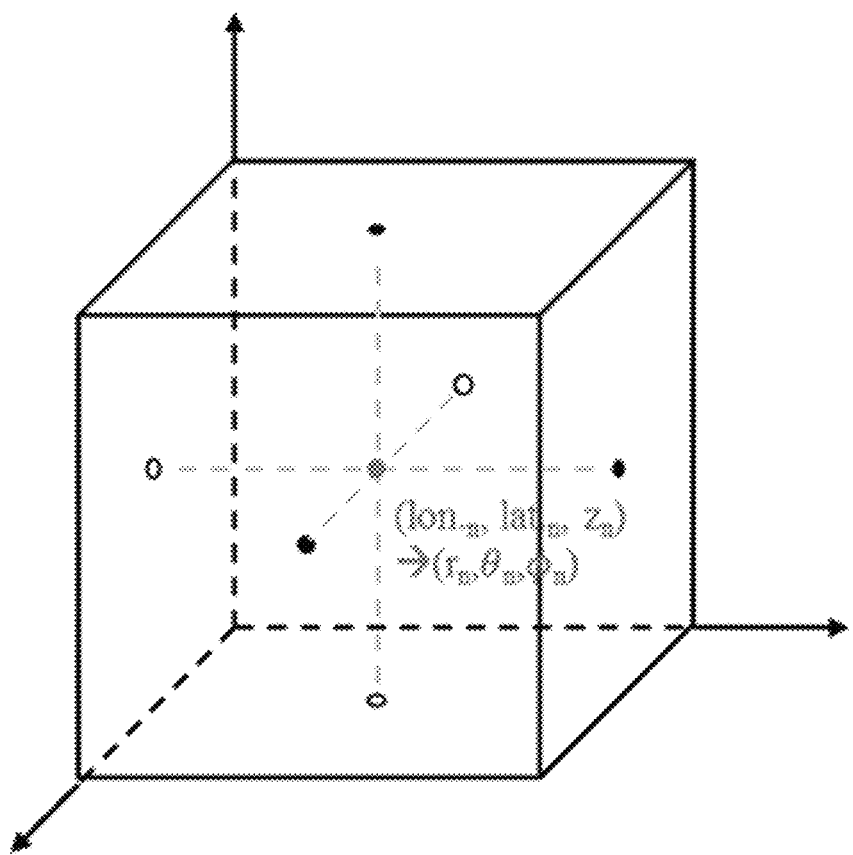
Figure 5:
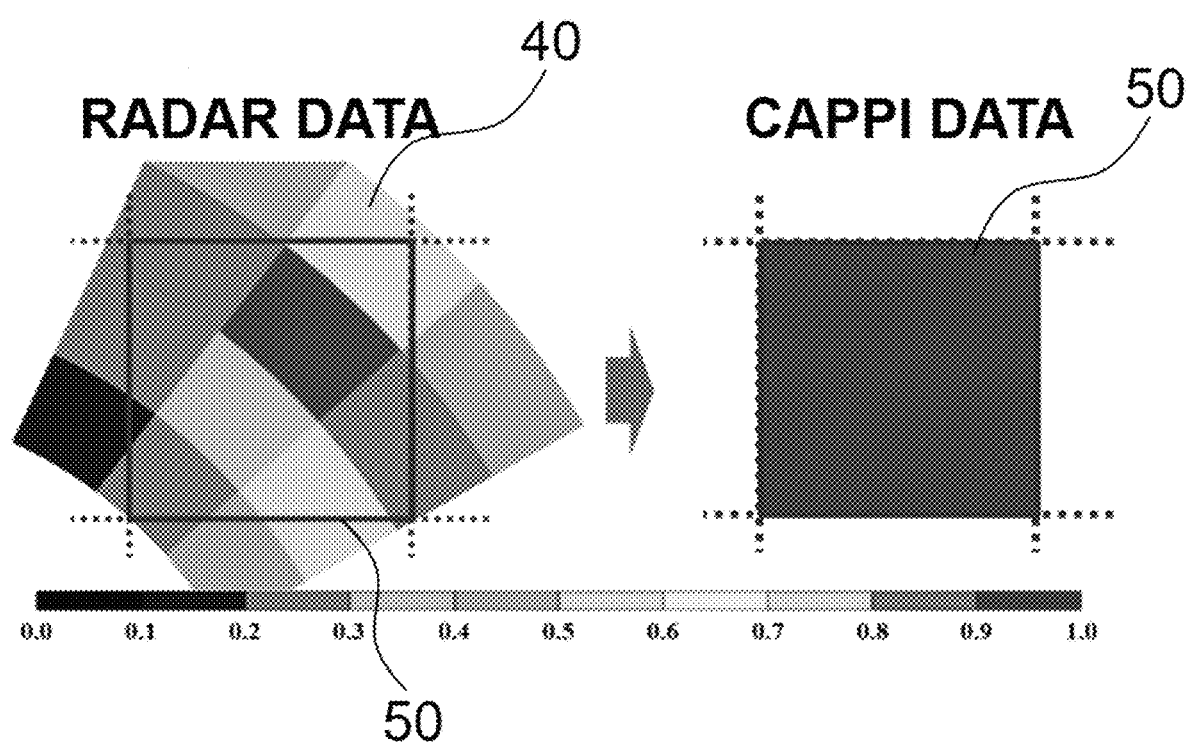
FIG. 5 is a diagram illustrating an example of CAPPI data generated by selecting a maximum value of the dual-polarization weather radar observation data according to the other embodiment of the invention.
Figure 6:
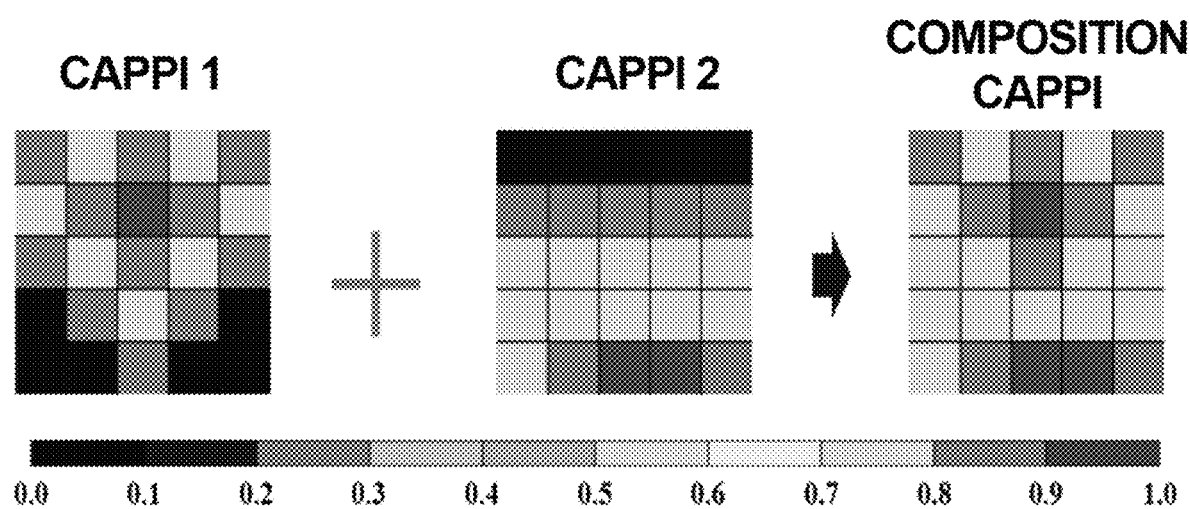
FIG. 6 is a diagram illustrating a process of performing composition of CAPPI data generated by observation data by different dual-polarization weather radars according to the other embodiment of the invention.

FIG. 3 is a flowchart illustrating processes of a method for composition for dual-polarization weather radar observation data according to another embodiment of the invention. FIGS. 4(a) and 4(b) are diagrams illustrating coordinate conversion in a coordinate converting step according to the other embodiment of the invention. FIG. 5 is a diagram illustrating an example of CAPPI data generated by selecting the maximum value of the dual-polarization weather radar observation data according to the other embodiment of the invention. FIG. 6 is a diagram illustrating a process of performing composition of CAPPI data generated by observation data by different dual-polarization weather radars according to the other embodiment of the invention.

As illustrated in FIG. 3, the method for composition for dual-polarization weather radar observation data according to the other embodiment of the invention can be configured to include a coordinate system converting step S10 of converting a reference grid of an orthogonal coordinate system into a grid of a dual-polarization weather radar spherical coordinate system based on a latitudinal-longitudinal coordinate system for each individual dual-polarization weather radar by using an earth spherical coordinate system, a CAPPI data generating step S20 of generating CAPPI data based on the orthogonal coordinate system after mapping individual items of dual-polarization weather radar observation data on grid coordinates of the dual-polarization weather radar spherical coordinate system, and a CAPPI data generating step S30 of performing composition of CAPPI data for the individual dual-polarization weather radars located at the same coordinate of the orthogonal coordinate system obtained by mapping the individual items of dual-polarization weather radar observation data, and generating composited CAPPI data.

The coordinate system converting step S10 can be configured to include a latitudinal-longitudinal coordinate system-based conversion step S11 of converting the reference grid of the orthogonal coordinate system into a reference grid of a latitudinal-longitudinal coordinate system, using an earth spherical coordinate system and a projection method selected to convert the orthogonal coordinate system into the latitudinal-longitudinal coordinate system, and a dual-polarization weather radar spherical coordinate system-based conversion step S12 of converting the generated reference grid of the latitudinal-longitudinal coordinate system into reference grids of a spherical coordinate system for each of the individual dual-polarization weather radars.

Execution of the latitudinal-longitudinal coordinate system-based conversion step S11 causes central points of a hexahedron which form grid points of dual-polarization weather radars set for weather analysis of the orthogonal coordinate system to be converted into coordinates of central points of a hexahedron of grid points of the reference grids of the latitudinal-longitudinal coordinate system by applying a projection method and the earth spherical coordinate system, as illustrated in FIG. 4(a).

Next, execution of the dual-polarization weather radar spherical coordinate system-based conversion step S12 causes coordinates of central points of a hexahedron of grid points having coordinates of the latitudinal-longitudinal coordinate system to be converted into origins on the spherical coordinate system as illustrated in FIG. 4(b), the origins indicating positions of the radars on the earth, a position of a grid point indicating an altitude angle $\theta_{mn}$ (radian) from the dual-polarization weather radar, a distance $r_{mn}$ (km), an azimuth $\phi_m$ (radian), and a ground distance $r_{gm}$ (km) in the dual-polarization weather radar, by Expressions (1) to (4).

After the coordinate system converting step S10 described above is executed, as illustrated in FIG. 2, the CAPPI data generating step S20 including a dual-polarization weather radar observation data mapping step S21 of mapping items of observation data of individual dual-polarization weather radars located within coordinates of central points of six surfaces of the reference grid of the radar spherical coordinate system, and a CAPPI data generating step S22 of generating CAPPI data as a CAPPI grid by converting spherical coordinates of grid points obtained by mapping the items of dual-polarization weather radar observation data thereon into coordinates of the orthogonal coordinate system and setting a CAPPI observation value is executed. The conversion of the spherical coordinates into the coordinates of the orthogonal coordinate system means conversion of a spherical coordinate $(r_{mn}, \theta_{mn}, \phi_{mn})$ obtained by mapping the m-th dual-polarization weather radar observation data thereon into an orthogonal coordinate system $(x_n, y_n, z_n)$, that is, conversion thereof into the orthogonal coordinate system to which a projection method is applied corresponding to the same grid number in a dual-polarization weather radar.

In the dual-polarization weather radar observation data mapping step S21, the items of dual-polarization weather radar observation data corresponding to coordinate values on coordinates of individual grid points converted into the spherical coordinate system are mapped as illustrated in (a) of FIG. 5. In FIG. 5, individual spherical coordinate system grids 40 are displayed two-dimensionally for convenience of display but are formed into three-dimensional hexahedrons as illustrated in FIGS. 4(a) and 4(b). Besides, the individual grids indicate a variable of the dual-polarization weather radar and a size of value.

Next, in the CAPPI data generating step S22, as illustrated in (b) of FIG. 5, after coordinates of the spherical coordinate system of the spherical coordinate system grids 40 by mapping the dual-polarization weather radar observation data are converted into coordinates of the orthogonal coordinate system, the CAPPI data is generated as a CAPPI grid 50 by setting a value of a dual-polarization weather radar randomly set depending on a purpose of a user to a grid point converted into the orthogonal coordinate system. At that point, the orthogonal coordinate systems obtained by selecting the same projection method have the same grid number in all of the dual-polarization weather radars. Hence, the spherical coordinate obtained by mapping the dual-polarization weather radar observation data can be immediately converted into a corresponding orthogonal coordinate system.

The CAPPI grid 50 is also displayed two-dimensionally for convenience of display but can be configured to be formed into a three-dimensional hexahedron. FIG. 5 illustrate an example in which the maximum value of the items of dual-polarization weather radar observation data mapped on the grid points of the spherical coordinate system corresponding to the CAPPI grid of (a) of FIG. 5 is set as a value of the CAPPI grid.

According to the embodiment of the invention, dual-polarization weather radar observation data enables coordinate conversion to be executed by applying the projection method once, the coordinate conversion being executed for direct composition with numerical value model data or observation data obtained by a ground observing instrument or the like which is ground observation data of an orthogonal coordinate system, and thus an error in a coordinate converting process is remarkably reduced by applying the projection method only once such that reliability of data improves. Consequently, when the items of CAPPI data converted into a final orthogonal coordinate have the same coordinate value, the items of dual-polarization weather radar observation data subjected to coordinate conversion by applying the same projection and earth spherical coordinate system thereto can be subjected to direct composition at the same position without an additional conversion process and can be also subjected to direct composition with the numerical value model data or observation data obtained by a ground observing instrument or the like which is ground observation data of an orthogonal coordinate system, and thus an error in comparison or composition result value is reduced such that reliability of data remarkably improves. In addition, the method for composition for dual-polarization weather radar observation data according to the other embodiment of the invention enables only the dual-polarization weather radar data in a grid of a rectangular parallelepiped to be efficiently used by applying simple coordinate conversion. Values of individual grids can be determined to select the mean value, the maximum value, or a maximum frequency value of variables of the dual-polarization weather radar observation data depending on a purpose of a user.

As described above, after the items of dual-polarization weather radar observation data are converted into the CAPPI data, several items of CAPPI data (CAPPI 1 and CAPPI 2) can be subjected to composition based on the same coordinate value in the CAPPI data compositing step S30 as illustrated in FIG. 6. At this point, the items of analysis information of the items of dual-polarization weather radar observation data can be set to one or more values of the mean value, the maximum value, or the maximum frequency value of the items of dual-polarization weather radar observation data in the CAPPI grid. In FIG. 6, the maximum value of the individual items of CAPPI data is set to a value of the composited CAPPI data. Consequently, the items of dual-polarization weather radar observation data of the same coordinate system or the numerical value model data or the observation data obtained by a ground observing instrument or the like which is ground observation information of the orthogonal coordinate system can be subjected to direct composition without executing additional conversion.

According to the invention, the following effect is provided. Dual-polarization weather radar observation data enables coordinate conversion to be executed by applying a projection method once, the coordinate conversion being executed for direct composition with numerical value model data or observation data obtained by a ground observing instrument or the like which is ground observation data of an orthogonal coordinate system, and thus an error in a coordinate converting process is remarkably reduced by applying the projection method only once such that reliability of data improves.

In addition, according to the invention, the following effect is provided. When items of CAPPI data converted into a final orthogonal coordinate have the same coordinate value, items of the dual-polarization weather radar observation data subjected to coordinate conversion by applying the same projection method and earth spherical coordinate system thereto can be subjected to direct composition at the same position without an additional conversion process and can be also subjected to composition with the numerical value model data or observation data obtained by a ground observing instrument or the like which is ground observation data of an orthogonal coordinate system, and thus an error in comparison or composition result value is reduced such that reliability of data remarkably improves.

In addition, a method for composition for dual-polarization weather radar observation data according to an embodiment of the invention provides an effect of efficiently using only the dual-polarization weather radar data in a grid of a rectangular parallelepiped by applying simple coordinate conversion.

Hence, the invention can be applied to a basic technique essential to National Oceanic and Atmospheric Administration, the Federal Emergency Management Agency, a floodgate-related agency, the aerospace industry, and the aeronautical meteorological industry.

The technical idea of the invention described above is specifically described in the preferred embodiments; however, attention needs to be paid to the following description. The embodiments are provided for the description and are not provided to limit the invention. In addition, it is possible for a person of ordinary knowledge in the technical field of the invention to understand that various embodiments can be made within a range of the technical idea of the invention. Hence, a true technical protection range needs to be set depending on the technical idea of the accompanying claims.

While the present invention has been described with respect to the specific embodiments, it will be apparent to those skilled in the art that various changes and modifications may be made without departing from the spirit and scope of the invention as defined in the following claims.

What is claimed is:

1. An apparatus for composition for dual-polarization weather radar observation data, comprising:
   a coordinate system converting unit that converts a reference grid of an orthogonal coordinate system into a grid of a dual-polarization weather radar spherical coordinate system based on a latitudinal-longitudinal coordinate system for each of individual dual-polarization weather radars by using an earth spherical coordinate system;
   a CAPPI data generating unit that generates CAPPI data based on the orthogonal coordinate system after mapping individual items of the dual-polarization weather radar observation data on grid coordinates of the dual-polarization weather radar spherical coordinate system; and
   a CAPPI data compositing unit that performs composition of CAPPI data for each of the individual dual-polarization weather radars located at a same coordinate of the orthogonal coordinate system obtained by mapping the individual items of the dual-polarization weather radar observation data
   wherein the CAPPI data generating unit is configured
      to map items of observation data of the individual dual-polarization weather radars located within coordinates of central points of six surfaces of the reference grid of the dual-polarization weather radar spherical coordinate system, and
      to generate the CAPPI data as a CAPPI grid by converting a spherical coordinate obtained by mapping items of m-th dual-polarization weather radar observation data thereon into the orthogonal coordinate system and setting a CAPPI observation value.

2. The apparatus for composition for dual-polarization weather radar observation data according to claim 1,
   wherein the coordinate system converting unit is configured
      to convert the reference grid of the orthogonal coordinate system into a reference grid of the latitudinal-longitudinal coordinate system, using an earth spherical coordinate system and a projection method selected to convert the orthogonal coordinate system into the latitudinal-longitudinal coordinate system, and
      to convert the reference grid of the latitudinal-longitudinal coordinate system into reference grids of a spherical coordinate system for each of the individual dual-polarization weather radars.

3. The apparatus for composition for dual-polarization weather radar observation data according to claim 1, wherein the conversion of the spherical coordinate obtained by mapping the items of the m-th dual-polarization weather radar observation data thereon into the orthogonal coordinate system includes conversion of the spherical coordinate into the orthogonal coordinate system by applying a projection method corresponding to a grid number in a dual-polarization weather radar.

4. The apparatus for composition for dual-polarization weather radar observation data according to claim 1, wherein the CAPPI observation value is set by selecting one from items of analysis information of the individual items of the dual-polarization weather radar observation data in the CAPPI grid, depending on a purpose of weather analysis.

5. The apparatus for composition for dual-polarization weather radar observation data according to claim 4, wherein the items of analysis information of the individual items of the dual-polarization weather radar observation data include one or more values of a mean value, a maximum value, or a maximum frequency value of the individual items of the dual-polarization weather radar observation data in the CAPPI grid.

6. A method for composition for dual-polarization weather radar observation data, comprising:
converting a reference grid of an orthogonal coordinate system into a grid of a dual-polarization weather radar spherical coordinate system based on a latitudinal-longitudinal coordinate system for each of individual dual-polarization weather radars by using an earth spherical coordinate system;
generating CAPPI data based on the orthogonal coordinate system after mapping individual items of dual-polarization weather radar observation data on grid coordinates of the dual-polarization weather radar spherical coordinate system; and
performing composition of CAPPI data for each of the individual dual-polarization weather radars located at a same coordinate of the orthogonal coordinate system obtained by mapping the individual items of the dual-polarization weather radar observation data thereon, and generating composited CAPPI data,
wherein generating the CAPPI data based on the orthogonal coordinate system includes:
mapping items of observation data of individual dual-polarization weather radars located within coordinates of central points of six surfaces of the reference grid of the dual-polarization weather radar spherical coordinate system, and
generating the CAPPI data as a CAPPI grid by converting a spherical coordinate obtained by mapping the individual items of the dual-polarization weather radar observation data into the orthogonal coordinate system and setting a CAPPI observation value.

7. The method for composition for dual-polarization weather radar observation data according to claim 6, wherein converting the reference grid of the orthogonal coordinate system includes:
converting the reference grid of the orthogonal coordinate system into a reference grid of the latitudinal-longitudinal coordinate system, using an earth spherical coordinate system and a projection method selected to convert the orthogonal coordinate system into the latitudinal-longitudinal coordinate system, and
converting the reference grid of the latitudinal-longitudinal coordinate system into reference grids of a spherical coordinate system for each of the individual dual-polarization weather radars.

8. The method for composition for dual-polarization weather radar observation data according to claim 6, wherein the conversion of the spherical coordinate obtained by mapping the individual items of the dual-polarization weather radar observation data into the orthogonal coordinate system includes conversion of the spherical coordinate into the orthogonal coordinate system by applying a projection method corresponding to a grid number in a dual-polarization weather radar.

9. The method for composition for dual-polarization weather radar observation data according to claim 6, wherein the CAPPI observation value is set by selecting one from items of analysis information of the individual items of the dual-polarization weather radar observation data in the CAPPI grid, depending on a purpose of weather analysis.

10. The method for composition for dual-polarization weather radar observation data according to claim 9, wherein the items of analysis information of the individual items of the dual-polarization weather radar observation data include one or more values of a mean value, a maximum value, or a maximum frequency value of the individual items of the dual-polarization weather radar observation data in the CAPPI grid.

* * * * *